(12) United States Patent
Kobayashi et al.

(10) Patent No.: US 6,284,361 B1
(45) Date of Patent: Sep. 4, 2001

(54) MAGNETIC RECORDING MEDIUM AND PROCESS FOR PRODUCING THE SAME

(75) Inventors: Hideyuki Kobayashi; Kazutaka Yamashita; Masayasu Sato, all of Tochigi-ken (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/181,082

(22) Filed: Oct. 27, 1998

(30) Foreign Application Priority Data

Nov. 14, 1997 (JP) .................................................. 9-313382

(51) Int. Cl.$^7$ .................................................. G11B 5/733
(52) U.S. Cl. .................... 428/323; 428/328; 428/329; 428/336; 428/694 BS; 428/694 BN; 428/900
(58) Field of Search .................... 428/323, 328, 428/329, 336, 694 BS, 694 BN, 900

(56) References Cited

U.S. PATENT DOCUMENTS

| | | | |
|---|---|---|---|
| 3,676,216 | * | 7/1972 | Abitboul .............................. 117/237 |
| 5,132,132 | * | 7/1992 | Watanabe et al. .................... 427/131 |
| 5,637,390 | * | 6/1997 | Isobe et al. .......................... 428/323 |
| 5,693,397 | * | 12/1997 | Saito et al. .......................... 428/65.3 |

FOREIGN PATENT DOCUMENTS

| | | |
|---|---|---|
| 57-78630 | 5/1982 | (JP) . |
| 6-126828 | 5/1994 | (JP) . |
| 6-243460 | 9/1994 | (JP) . |
| 6-274855 | 9/1994 | (JP) . |
| 6-282836 | 10/1994 | (JP) . |
| 7-314551 | 12/1995 | (JP) . |
| 7-326043 | 12/1995 | (JP) . |
| 8-90648 | 4/1996 | (JP) . |
| 8-335310 | 12/1996 | (JP) . |

OTHER PUBLICATIONS

T. Masuko, "Rheological Properties of Magnetic Paints in Relation to Dispersibility of Acicular Fe Fine Particles", Reports on Progress in Polymer Physics in Japan, vol. XXIX, 1986, pp. 111–114.

* cited by examiner

Primary Examiner—Stevan A. Resan
(74) Attorney, Agent, or Firm—Sughrue, Mion, Zinn, Macpeak & Seas, PLLC (57) ABSTRACT

A magnetic recording medium comprising a substrate having provided thereon at least one intermediate layer essentially containing nonmagnetic powder and a binder and further having thereon a magnetic layer as an upper layer which essentially contains ferromagnetic powder and a binder, wherein the nonmagnetic powder in the intermediate layer is mainly acicular, and the acicular nonmagnetic powder has a coefficient of orientation ($\alpha$) of 0 to 0.8 in the longitudinal direction in the surface thereof.

11 Claims, 3 Drawing Sheets

MAGNETIC RECORDING MEDIUM AND PROCESS FOR PRODUCING THE SAME

BACKGROUND OF THE INVENTION

1. Filed of the Invention

This invention relates to a magnetic recording medium and a process for producing the same. More particularly, it relates to a multi-layered magnetic recording medium and a process for producing the same, in which the stiffness is controlled, particularly the stiffness in the width direction is improved, to improve various required characteristics, such as improved output by a head touch, tape exchangeability, adequate bending stiffness for prevention of edge cracks, and reduced fluctuations in slit width direction.

2. Description of the Related Art

Stiffness of a magnetic recording medium has conventionally been controlled by using a base film (substrate) having different Young's modulus in its longitudinal direction and width direction. Where a substrate has on its reverse side a backcoating layer, the stiffness is also controllable by changing the thickness of the backcoating layer.

However, a change of the stiffness of a base film or of the thickness of a backcoating layer is liable to present difference problems. For example, to use a base film whose ratio of stiffness in the longitudinal direction to that in the width direction has been changed decreases the yield and increases the cost. Thickening of a backcoating layer tends to result in insufficient drying because of the low solids content of the coating composition.

When a coating composition containing acicular particles is applied by a usual coating technique, such as doctor blade coating, gravure coating, reverse roll coating, die coating, etc., a shear force is imposed on the coating composition so that the particles are oriented in the longitudinal direction. This being the case, the resulting magnetic recording medium has insufficient stiffness in the width direction for improving the above-mentioned characteristics.

T. Masuko, J. Sugawara, and K. Iwakura report in *Repts, Progr. Phys. Jpn.*, 38, in press (1986) that acicular magnetic particles are oriented in the shear direction with a shear force stronger than the cohesive force applied thereto. Nonmagnetic particles in a coating composition are similarly oriented in the longitudinal direction by imposing a shear force on the coating composition in the longitudinal direction on application as disclosed in Japanese Patent Laid-Open No. 274855/194. However, it is desirable for a magnetic disc or a magnetic sheet to be isotropic in stiffness. Although magnetic particles could be made isotropic by random orientation, it is difficult to isotropically orient nonmagnetic particles by magnetic field orientation.

It is important for a magnetic tape to have well-balanced stiffness in its longitudinal direction and width direction. In using acicular ferromagnetic powder, however, the stiffness becomes higher in the longitudinal direction because the particles should be oriented in the longitudinal direction in order to obtain high outputs in electromagnetic conversion characteristics at the sacrifice of stiffness in the width direction.

Japanese Patent Laid-Open Nos. 314551/95, 90648/96, and 126828/94 propose using, as a base film, a biaxially stretched polyester film which has an improved Young's modulus in the width direction thereby to improve the stiffness in the width direction. Japanese Patent Laid-Open No. 78630/82 teaches improvement comprising using acicular ferromagnetic particles in a lower layer and applying a magnetic field in the width direction to orient the particles in that direction. Japanese Patent Laid-Open Nos. 282836/94 and 243460/94 disclose similar techniques, in which acicular hexagonal magnetic ferrite particles are oriented in a lower layer by magnetic field treatment so as to have their major axis in parallel to the width direction. Further, a method for controlling the stiffness balance in the longitudinal and width directions by using polyhedral inorganic particles having a spherical to cubic shape is disclosed in Japanese Patent Laid-Open No. 335310/96. These conventional techniques are disadvantageous in that high cost is incurred or the effects produced are not sufficient because of the spherical shape of the particles. Unlike these techniques, the idea of the present invention consists in controlling the degree of orientation of acicular nonmagnetic particles of an intermediate layer by the shape of the particles, the direction of shear imposed to the coating composition immediately before application, and dispersion of the coating composition.

Japanese Patent Laid-Open No. 326043/95 discloses a magnetic recording medium containing acicular $\alpha$-$Fe_2O_3$ as the main particles of a lower layer having added thereto a slight amount of magnetic powders so as to have the orientation in the longitudinal direction, whereby the orientation of filler in the lower layer is strengthen and the smoothness of the boundary surface between upper and lower layers and the top surface of a magnetic layer is improved. In this publication, the longitudinal direction is referred to in contrast to the perpendicular direction. On the other hand, the present invention is to improve the film stiffness by rendering the orientation in the longitudinal and width directions in the surface thereof closer to random orientation. In the present direction the longitudinal direction in the surface direction is referred to in contrast to the width direction.

SUMMARY OF THE INVENTION

Accordingly, an object of the present invention is to provide a magnetic recording medium and a process for producing the same, in which required characteristics, such as improved output by a head touch, tape exchangeability, adequate bending stiffness for prevention of edge cracks, and reduced fluctuations in the slit width direction, are improved by stiffness control, especially by increasing the stiffness in the width direction.

The present inventors of the invention have found that the above object is accomplished by specifying the shape and the degree of orientation of nonmagnetic powder used in an intermediate layer.

Based on the above finding, the present invention provides a magnetic recording medium comprising a substrate having provided thereon at least one intermediate layer essentially containing nonmagnetic powder and a binder and further having thereon a magnetic layer as an upper layer which essentially contains ferromagnetic powder and a binder, wherein the nonmagnetic powder in the intermediate layer is mainly acicular, and the acicular nonmagnetic powder has a coefficient of orientation ($\alpha$) of 0 to 0.8 in the longitudinal direction in the surface thereof.

The present invention also provides a preferred process for producing the magnetic recording medium of the present invention comprising applying an intermediate coating composition and a magnetic coating composition to a substrate, in which the intermediate coating composition receives a shear force in a given direction within 20 seconds before application, the shear direction A of the shear force not being in the plane formed of a vector B normal to the surface of the substrate to be coated and the moving direction C of the substrate, and the angle formed between the shear direction A and the vector B is from 95 to 170°.

The present invention further provides another preferred process for producing the magnetic recording medium of the present invention comprising applying an intermediate coating composition and a magnetic coating composition to a substrate, in which the intermediate coating composition receives a shear force by a rotator within 20 seconds before application, and the angle formed between the axial direction of the rotator and the moving direction C of the substrate is within 30°, i.e. 0 to 30°.

According to the present invention, stiffness control, especially increase of stiffness in the width direction, brings about improvements in various characteristics, such as improved output by a head touch, tape exchangeability, bending stiffness for prevention of edge cracks, and reduced fluctuations in the slit width direction.

The processes of the present invention produce the magnetic recording medium of the present invention easily.

DETAILED DESCRIPTION OF THE INVENTION AND PREFERRED EMBODIMENTS THEREOF

The magnetic recording medium according to the present invention comprises a substrate having provided thereon at least one intermediate layer essentially containing nonmagnetic powder and a binder and, as an upper layer, a magnetic layer essentially containing ferromagnetic powder and a binder. If desired, the magnetic recording medium can have a backcoating layer on the back side of the substrate. Further, the magnetic recording medium can have a primer layer between the substrate and the intermediate layer or the backcoating layer or an additional magnetic layer for recording servo signals to cope with hardware using long wavelength signals.

The magnetic layer, which is a layer usually disposed as an upper layer, is formed by applying a magnetic coating composition containing ferromagnetic powder, a binder, and a solvent. If desired, a lubricant layer, a protective layer, etc. may be provided on the magnetic layer.

The ferromagnetic powder used in the magnetic layer includes ferromagnetic metal powder consisting solely or mainly of iron and hexagonal tabular ferromagnetic ferrite powder.

The ferromagnetic metal powder includes powder having a metal content of not less than 50% by weight, 60% by weight or more of which is Fe. Specific examples of such ferromagnetic metal powder includes Fe powder and powder of an Fe alloy, e.g., Fe—Co, Fe—Ni, Fe—Al, Fe—Ni—Al, Fe—Co—Ni, Fe—Ni—Al—Zn, and Fe—Al—Si.

The ferromagnetic metal powder consisting mainly of Fe preferably has an acicular shape or a spindle shape, with its major axis preferably having a length of 0.05 to 0.25 $\mu$m, particularly 0.05 to 0.2 $\mu$m, its acicular ratio being preferably 3 to 20, its X-ray particle diameter being preferably 130 to 250 Å, and its BET specific surface area being preferably 40 m$^2$/g or more, particularly 40 to 70 m$^2$/g.

The hexagonal tabular ferromagnetic ferrite powder includes fine tabular particles of barium ferrite or strontium ferrite, part of the Fe atoms of which may be replaced by Ti, Co, Ni, Zn, V or the like atoms. The hexagonal tabular ferromagnetic ferrite powder preferably has a tabular diameter of 0.02 to 0.09 $\mu$m, an aspect ratio of 2 to 7, and a BET specific surface area of 40 m$^2$/g or more, particularly 40 to 70 m$^2$/g.

The coercive force of the ferromagnetic powder is preferably 100 to 210 kA/m, more preferably 120 to 200 kA/m. Within this range, RF outputs can be obtained over a fill wavelength region with no excess nor shortage, and satisfactory overwrite characteristics are exhibited.

The saturation magnetization of the ferromagnetic metal powder preferably ranges from 100 to 180 Am$^2$/kg, particularly 110 to 160 Am$^2$/kg. The saturation magnetization of the hexagonal tabular ferromagnetic ferrite powder is preferably 30 to 70 Am$^2$/kg, particularly 45 to 70 Am$^2$/kg. Within these ranges, sufficient reproduction outputs are secured.

If desired, the magnetic powder to be used in the magnetic layer may contain rare earth elements or transition metal elements.

The magnetic coating composition for forming the magnetic layer may contain nonmagnetic powder. The nonmagnetic powder which can be used in the magnetic layer can be selected from those useful in the intermediate layer hereinafter described.

The magnetic coating composition for the magnetic layer may contain carbon black Suitable carbon black species include furnace black for rubber, thermal black for rubber, carbon black for colors, acetylene black, and Ketjen black.

For the detail, reference can be made in *Carbon Black Binran*, Carbon Black Kyokai (ed.).

The binder which can be used in the magnetic coating composition forming the magnetic layer includes thermoplastic resins, thermosetting resins, and reactive resins, either individually or as a mixture thereof Examples of suitable binders are vinyl chloride resins, polyester, polyurethane, nitrocellulose, and epoxy resins. In addition, the resins described in Japanese Patent Laid-Open No. 162128/82, page 2, upper right column, line 19 to lower right column, line 19 are also employable. These binders can contain a polar group for improvement in dispersibility.

The binder is suitably used in an amount of from 5 to 200 parts by weight, preferably of from 5 to 70 parts by weight, per 100 parts by weight of the ferromagnetic powder.

The solvent which can be used in the magnetic coating composition for providing the magnetic layer includes ketones, esters, ethers, aromatic hydrocarbons, and chlorinated hydrocarbons. Specific examples of suitable solvents are given in Japanese Patent Laid-Open No. 162128/82, page, 3, lower right column, line 17 to page 4, lower left column, line 10.

The solvent is preferably used in an amount of 80 to 500 parts by weight, more preferably 100 to 350 parts by weight, per 100 parts by weight of the ferromagnetic powder.

If desired, the magnetic coating composition used for the formation of the magnetic layer may contain additives generally used in magnetic recording media. Useful additives include dispersants, lubricants, abrasives, antistatic agents, rust inhibitors, and antifungals or fungistats. Specific examples of useful additives are described in Japanese Patent Laid-Open No. 162128/82, page 2, lower left column, line 6 to lower right column, line 10 and page 3, lower left column, line 6 to upper right column, line 18.

The magnetic layer preferably has a thickness of 0.05 to 1 $\mu$M, more preferably 0.05 to 0.5 $\mu$m. Within this range, the output stability and durability are well balanced.

The magnetic coating composition is prepared by, for example, preliminarily mixing the ferromagnetic powder and the binder together with a portion of the solvent in a Naughter mixer, etc., kneading the premixture in a continuous pressure kneader, etc., diluting the mixture with another portion of the solvent, followed by dispersing in a sand mill, etc., adding to the dispersion additives, such as a lubricant, filtering the dispersion, and adding thereto a hardener (e.g., polyisocyanate) and the remainder of the solvent.

The intermediate layer is a layer essentially containing nonmagnetic powder and a binder and may be either a magnetic layer or a nonmagnetic layer. Two or more intermediate layers may be provided. The intermediate layer can be formed by using a coating composition comprising mainly nonmagnetic powder, a binder, and a solvent (hereinafter referred to as an intermediate coating composition). The purpose of providing the intermediate layer is for improvements in magnetostatic characteristics and surface smoothness.

The nonmagnetic powder to be used in the intermediate layer has an acicular shape and a coefficient of orientation ($\alpha$) of 0 to 0.8 in the longitudinal direction in the surface thereof, preferably 0 to 0.5, particularly 0 to 0.3. If the coefficient of orientation in the longitudinal direction in the surface thereof ($\alpha$) exceeds 0.8, the bending stiffness in the width direction is unfavorably reduced. On the other hand, the coefficient of orientation in the width direction ($\beta$) is preferably 0 to 0.4, particularly 0 to 0.25. If the coefficient of orientation ($\beta$) exceeds 0.4, the bending stiffness in the longitudinal direction is unfavorably reduced.

The coefficient of orientation can be obtained as follows. A single- or double-sided conductive adhesive tape is tightly stuck to the magnetic layer of a prepared magnetic recording medium and stripped off to remove the magnetic layer and the intermediate layer together from the substrate. The exposed intermediate layer, with the longitudinal direction being marked, is photographed with FE-SEM at magnifications varied from 50,000 to 100,000 according to the particle size of the acicular nonmagnetic particles. If the image is distorted due to charge-up, etc., it is recommended to coat the surface with a conductive layer of Au, Pt, Pd, etc. by sputtering.

Figure 4:
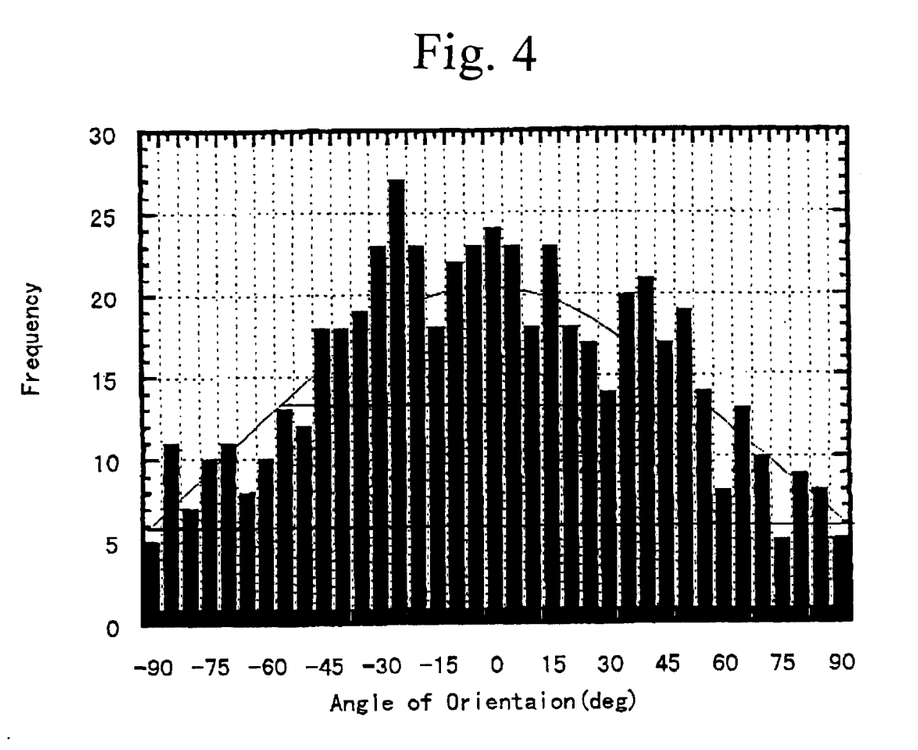
FIG. 4 is a graph showing the orientation degree of the nonmagnetic powder.

The photograph showing the orientation of the acicular nonmagnetic particles is inputted into a computer, and the angle of orientation to the longitudinal direction over a range of from −90° to +90° is measured for every acicular nonmagnetic particle in the photograph with graphic software. The number (n) of the acicular nonmagnetic particles should be at least 300 by five photographs on different observation points. The resulting data are made into a histogram for every 5° to obtain an approximate distribution curve (see FIG. 4). Where the peak appears between −45° and +45°, a base line is drawn from the approximate distribution curve. The half-value width taken as $A_{50}$, the degree of orientation is obtained in terms of coefficient of orientation $\alpha=(180-A_{50})/180$. When the peak of orientation is in the width direction, the angle of orientation is obtained to the width direction, taking $\alpha$ as 0, and the coefficient of orientation $\beta$ is similarly calculated from $(180-B_{50})/180$, in which $B_{50}$ is a half-value width of the peak. In a non-oriented state, both $\alpha$ and $\beta$ are zero.

The nonmagnetic powder which can be used in the intermediate layer includes particles of graphite, titanium oxide, barium sulfate, zinc sulfide, magnesium carbonate, calcium carbonate, zinc oxide, calcium oxide, magnesium oxide, magnesium dioxide, tungsten disulfide, molybdenum disulfide, boron nitride, tin dioxide, silicon dioxide, nonmagnetic chromium oxide, alumina, silicon carbide, cerium oxide, corundum, artificial diamond, nonmagnetic iron oxide, garnet, siliceous stone, silicon nitride, molybdenum carbide, boron carbide, tungsten carbide, titanium carbide, diatomaceous earth, dolomite, and resins. In particular, nonmagnetic iron oxide, titanium oxide, alumina, silicon dioxide, silicon nitride, and boron nitride are preferred. These nonmagnetic powders can be used either individually or as a combination of two or more thereof.

The nonmagnetic powder is acicular as stated above and preferably has a major axis length of 20 to 300 nm with an acicular ratio of 2 to 10, more preferably 2 to 6, particularly preferably 2 to 3. With the major axis length and the acicular ratio falling within the above respective ranges, nearly random orientation can be achieved. If the acicular ratio is less than 2, the minor axis length will be long, with the specific surface area being fixed, which increases the apparent particle size, resulting in a failure of securing satisfactory surface properties. If the acicular ratio exceeds 6, the coefficient of orientation ($\alpha$) in the longitudinal direction in the surface thereof becomes too high and the bending stiffness in the width direction is reduced, thus unfavorably resulting in the positional fluctuation of the tape in width direction and the occurrence of the edge cracks in the repeated running test.

The acicular shape referred to here means approximately acicular shapes including a spindle shape, a rice-particle shape and a bar shape.

It is desirable for the intermediate coating composition to contain magnetic powder. The magnetic powder includes hexagonal tabular ferromagnetic ferrite powder. The kind, shape, physical properties and the like of the hexagonal tabular ferromagnetic ferrite powder to be used here are the same as mentioned with respect to the magnetic layer. As to BET specific surface area, hexagonal tabular ferromagnetic ferrite powder having a smaller BET specific surface area than that used in the magnetic layer can be used. A preferred BET specific surface area is 30 to 60 $m^2/g$. The tabular diameter of the ferrite powder is preferably 0.02 to 0.06 $\mu$m. Such tabular magnetic powder exerts a steric hindrance action even when a unidirectional shear force is imposed to the coating composition, thereby facilitating random orientation of the nonmagnetic acicular powder.

If desired, the above-described magnetic powder or nonmagnetic powder can contain rare earth elements or transition elements. For the purpose of improving dispersibility of the magnetic powder or nonmagnetic powder, the powder can be subjected to the same surface treatment as can be given to the ferromagnetic powder for use in the magnetic coating composition for the magnetic layer.

It is preferred for the intermediate coating composition to contain carbon black. The same carbon black species as can be added to the magnetic layer are usable.

The binder and the solvent which are used in the intermediate coating composition are also the same as those useful in the magnetic coating composition for the magnetic layer.

Where the intermediate layer contains the nonmagnetic powder and magnetic powder, the binder is preferably used in an amount of 5 to 200 parts by weight, particularly 5 to 70 parts by weight, per 100 parts by weight of the total amount of the nonmagnetic powder and the magnetic powder.

Where the intermediate layer contains the nonmagnetic powder and magnetic powder, the solvent is preferably used in an amount of 80 to 500 parts by weight, particularly 100 to 350 parts by weight, per 100 parts by weight of the total amount of the nonmagnetic powder and the magnetic powder.

If desired, the intermediate coating composition may contain various additives usable in the magnetic coating composition for the magnetic layer.

The intermediate layer preferably has a thickness of 0.1 to 3 $\mu$m, particularly 0.25 to 2.5 $\mu$m. The magnetic recording medium can have sufficient bending stiffness with the intermediate layer having a thickness within this range. The present invention is particularly effective where the intermediate layer is thicker than the magnetic layer. For securing sufficient stiffness while satisfying suitability to high-density recording, it is preferable that the intermediate layer be at least 1.5 times, particularly twice, as thick as the magnetic layer.

The intermediate coating composition is prepared by, for example, preliminarily mixing the nonmagnetic powder, the binder, etc. together with a portion of the solvent in a Naughter mixer, etc., kneading the premixture in a continuous pressure kneader, etc., diluting the mixture with another portion of the solvent, followed by dispersing in a sand mill, etc., adding to the dispersion additives, such as a lubricant, filtering the dispersion, and adding thereto the hardener and the remainder of the solvent.

The substrate which can be used in the present invention is not particularly limited, and any known nonmagnetic substrate can be used. The polymer used for the substrates includes polyethylene terephthalate, polyethylene terenaphthalate, polyamide. These polymers can be used either individually or as a combination of two or more thereof. Among them, polyester film is preferably used from the viewpoint of the cost and easiness in obtaining. In addition, the improvement of the properties such as bending stiffness described in the present specification is more distinct in the film having low Young's modulus such as polyester than the film having high Young's modulus such as polyamide.

The backcoating layer, which is provided on the back side of the substrate if necessary, can be formed by using any known backcoating composition with no particular limitation.

The magnetic recording medium of the present invention is suitable for use as magnetic tapes, such as an 8 mm video tape and a DAT tape, and floppy discs. Their particular effectiveness is in use as a magnetic tapes having thin thickness of medium for recording a high capacity of data (particularly medium thickness of 7 $\mu$m or less).

A process for producing the magnetic recording medium of the present invention is as follows. An intermediate coating composition forming an intermediate layer and a magnetic coating composition forming a magnetic layer are prepared and applied through respective dies to a substrate by simultaneous coating in a wet-on-wet coating system to form an intermediate layer and a magnetic layer having the respective desired dry thicknesses. That is, the magnetic layer is preferably formed when the intermediate layer is wet. A preferred coating speed is 50 to 1000 m/min.

The process of the present invention in one embodiment is characterized in that the intermediate coating composition receives a shear force in a given direction within 20 seconds before it is applied on the substrate through a die, the shear direction A of the shear force is not in the plane formed of a vector B normal to the surface of the substrate to be coated and the moving direction C of the substrate, and the angle formed between the shear direction A and the vector B is from 95 to 170°.

The step of applying the intermediate coating composition and the magnetic coating composition, especially the intermediate coating composition, to the substrate through respective dies will be illustrated by referring to the accompanying drawing.

Figure 1:
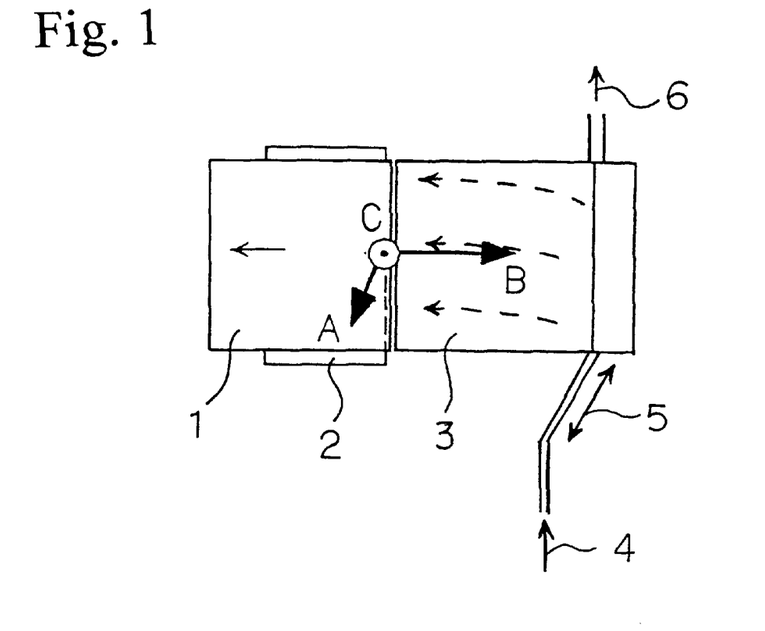
FIG. 1 illustrates an example of the step of applying an intermediate coating composition to a substrate in accordance with the present invention.

FIG. 1 shows an example of the step of applying an intermediate coating composition to a substrate, in which a shear force is applied to the coating composition by flow in accordance with the present invention. In the Figure, reference numeral 1 indicates a substrate; 2 a roll; 3 a coater head; 4 intermediate coating composition; 5 a pipe for high shear; and 6 a circulating coating composition. Symbol A indicates a shear direction; B a vector normal to the surface of the substrate to be coated; and C the moving direction of the substrate while being coated with the intermediate coating composition. The dotted lines show the flow direction of the intermediate coating composition 4.

In FIG. 1, the intermediate coating composition 4 having a prescribed composition receives a shear force along the shear direction A while flowing through the pipe for high shear 5 before entering the coater head 3, the position of the pipe 5 corresponding to within 20 seconds before the coating composition's being applied to the substrate. The pipe for high shear is a pipe having a reduced sectional area so as to give a high shearing force to the fluid flowing therethrough. The intermediate coating composition 4 having received a shear force is led to the coater head 3 and applied to the substrate 1 moving on the roll 2. It is required that the shear force A be not in the plane formed of the vector B and the direction C. It is also required that the angle formed between the shear direction A and the vector B be from 95 to 170°. Temporary application of a shear force to the traverse direction like this makes it possible to reduce the degree of orientation in the longitudinal direction. The shear direction is opposite to the coating composition's flowing direction.

The present invention in another embodiment is characterized in that the intermediate coating composition receives a shear force by a rotator within 20 seconds before application through a die to the substrate, and the angle formed between the axial direction of the rotator and the moving direction C of the substrate is within 30°.

Figure 2:
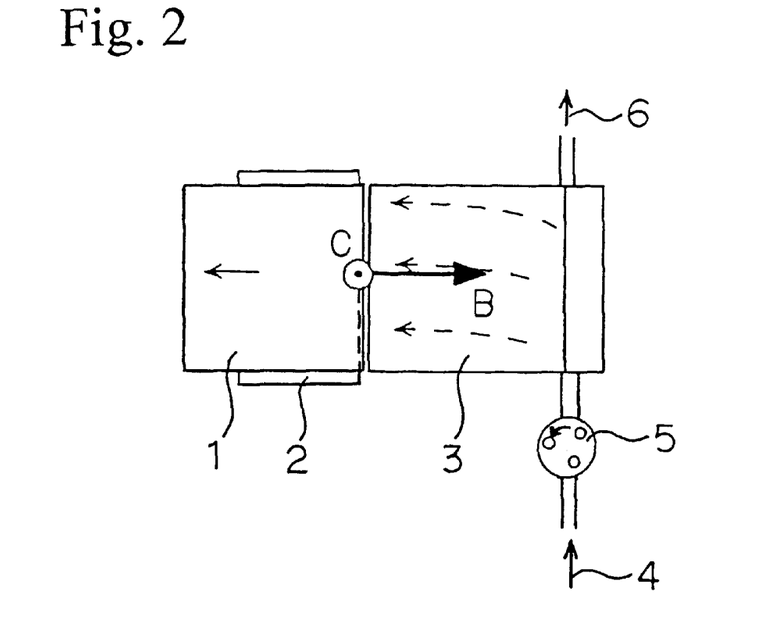
FIG. 2 illustrates another example of the step of applying an intermediate coating composition to a substrate in accordance with the present invention.

FIG. 2 shows another example of the step of applying an intermediate coating composition to a substrate, in which a shear force is applied to the coating composition by means of a rotator. The reference numerals and symbols have the same meanings as in FIG. 1, and numeral 7 indicates a rotator.

FIG. 2, the intermediate coating composition 4 having a prescribed composition receives a shear force by the rotator 7 before entering the coater head 3, the position of the rotator 7 corresponding to within 20 seconds before the coating composition's being applied to the substrate. The intermediate coating composition 4 having thus received a shear force is led to the coater head 3 and applied to the substrate 1 moving on the roll 2. It is required that the angle between the axial direction of the rotator 7 and the moving direction C of the substrate be within 30°, preferably within 20°.

Temporary application of a shear force like this makes it possible to reduce the degree of orientation in the longitudinal direction.

As far as the position where the shear force is imposed to the intermediate coating composition it must be within 20 seconds before application, the nonmagnetic powder would not be oriented in the longitudinal direction if a shear force in the longitudinal direction is exerted afterward. A coating layer having a low degree of particle orientation in the longitudinal direction would be oriented thereby. The term "applications" is used as a point of time in which the time of imposing a shear force on the coating composition is counted backward, i.e. the time when the coating composition comes into contact with the substrate.

A shear force is thus imposed by a flow or a mechanical force. A shear force can be imposed by rotating a rotor having a smooth or uneven surface or a pin, or by means of a bead mill.

The degree of orientation is influenced by the strength of the shear force. The maximum shear force that can be imposed has a shear rate of 10 to $10^7$ sec$^{-7}$. The shear force product (shear force×shear force application time) is preferably $10^1$ to $10^7$.

The degree of orientation is also influenced by the shear force imposed during the preparation of the composition which depends on conditions of kneading dispersion, particularly conditions of dispersing with a minimum amount of a dispersing medium, and milling conditions. The more the binder is adsorbed onto the particles, the lesser is the interaction among the particles and the easier is the separation of the particles by the shear force.

The coating film is then subjected to an orientation treatment in a magnetic field, dried, wound, and calendered. If desired, a backcoating layer is applied. In some cases, calendering is preceded by formation of a backcoating layer, and both the magnetic layer and the backcoating layer are subjected to calendering. According to necessity, for example, in the production of magnetic tapes, the coated material is aged at 40 to 70° C. for 3 to 72 hours and then slit to a prescribed width.

The above-mentioned simultaneous coating technique in a wet-on-wet coating system is described in Japanese Patent Laid-Open No. 73883/93, column 42, line 31 to column 43, line 31. This is a technique in which a magnetic coating composition for a magnetic layer is applied before an intermediate coating composition for an intermediate layer dries. Where this technique is adopted, the interface between the intermediate layer and the magnetic layer is smooth, and the magnetic layer has satisfactory surface properties, thereby to provide a magnetic recording medium causing few dropouts, capable of coping with high-density recording, and having durable coating film (both the intermediate and magnetic layers).

The magnetic field orientation treatment is performed before the intermediate coating composition and the magnetic coating compositions dry. In the production of a magnetic tape, for instance, the orientation treatment can be carried out by applying a magnetic field of about 40 kA/m or higher, preferably about 80 to 800 kA/m through a permanent magnet, in parallel with the coated side or passing the coated material through a solenoid type magnet of about 80 to 800 kA/m while the intermediate coating composition and the magnetic coating composition are wet.

The drying of the coating layer is carried out by, for example, supplying heated gas. The degree of drying can be controlled by adjusting the temperature and the feed rate of the gas. For example, the drying is preferably carried out by supplying hot air of 30 to 120° C. at a rate of 5 to 35 m/min for 1 to 60 seconds.

The calendering of the coated material is carried out by, for example, supercalendering comprising passing the coated film between two rolls, such as a combination of a metal roll and a cotton roll or a synthetic resin roll, or a combination of two metal rolls.

If desired, the coated film can be subjected to a finishing step, such as polishing or cleaning of the surface of the magnetic layer. It is possible to form the intermediate layer and the magnetic layer by a known successive coating technique.

The present invention will now be illustrated in greater detail with reference to Examples. Unless otherwise noted, all the parts are given by weight.

EXAMPLE 1

Preparation of Coating Composition:

Magnetic Coating Composition

| | |
|---|---|
| Acicular ferromagnetic metal powder mainly comprising Fe (Fe:Al:Ni:Co:Zn:Y:Nb = 70:5:0.5:15:0.5:8:1 (by weight); coercive force: 191 kA/m; saturation magnetization: 152 Am$^2$/kg; BET specific surface area: 52 m$^2$/g; X-ray particle diameter: 16 nm) | 100 parts |
| Nitrocellulose binder (CD220, produced by Asahi Chemical Industry Co., Ltd.) | 7 parts (as the solid component) |
| Sulfo-containing polyurethane resin binder (UR8300, produced by Toyobo Co., Ltd.) | 7 parts (as the solid component) |
| Alumina (abrasive) (average primary particle size: 0.2 μm) | 10 parts |
| Carbon black (average primary particle size: 20 nm) | 0.5 part |
| Butyl stearate (lubricant) | 1 part |
| Oleic acid (lubricant) | 1 part |
| Polyisocyanate compound (hardener) (Coronate L, produced by Nippon Polyurethane Industry Co., Ltd.) | 2 parts (as the solid component) |
| Methyl ethyl ketone (solvent) | 100 parts |
| Toluene (solvent) | 100 parts |
| Cyclohexanone (solvent) | 50 parts |

Intermediate Layer Coating Composition

| | |
|---|---|
| Acicular α-Fe$_2$O$_3$ (a) (nonmagnetic powder) (acicular ratio: 3; BET specific surface area: 48 m$^2$/g; average major axis length: 0.09 μm) | 100 parts |
| Nitrocellulose binder (CD220, produced by Asahi Chemical Industry Co., Ltd.) | 7 parts (as the solid component) |
| Sulfo-containing polyurethane resin binder (UR8300, produced by Toyobo Co., Ltd.) | 7 parts (as the solid component) |
| Alumina (abrasive) (average primary particle size: 0.2 μm) | 10 parts |
| Carbon black (average primary particle size: 20 nm) | 0.5 part |
| Butyl stearate (lubricant) | 1 part |
| Oleic acid (lubricant) | 1 part |
| Polyisocyanate compound (hardener) (Coronate L, produced by Nippon Polyurethane Industry Co., Ltd.) | 2 parts (as the solid component) |

| | |
|---|---|
| Methyl ethyl ketone (solvent) | 48 parts |
| Toluene (solvent) | 48 parts |
| Cyclohexanone (solvent) | 24 parts |

Preparation of Magnetic Recording Medium

The intermediate coating composition and the magnetic coating composition were applied simultaneously through respective dies to a 4 μm thick polyethylene terephthalate substrate having a Young's modulus of 650 kg/mm² in the longitudinal direction and of 460 kg/mm² in the width direction to a dry thickness of 1.0 μm and 0.25 μm, respectively. A shear force was given to the intermediate coating composition at a maximum shear rate of $10^2$ sec$^{-1}$ for 5 seconds with an angle of approach of 120° at the position 20 seconds before application (see FIG. 1). The coating speed was 300 m/min. The coated film was passed through a solenoid type magnet of 160 kA/m while the magnetic layer was wet, dried in a drying oven by applying hot air at 100° C. at a rate of 8 m/min, and then calendered. The coated film was slit into strips of 8 mm in width to obtain an 8-mm video tape.

EXAMPLE 2

A magnetic recording medium (8-mm video tape) was prepared in the same manner as in Example 1, except for replacing 100 parts of the acicular α-Fe₂O₃ (a) used in the intermediate coating composition with 50 parts of the acicular α-Fe₂O₃ (a) and 50 parts of hexagonal ferromagnetic barium ferrite powder having an average tabular diameter of 50 nm, an aspect ratio of 5.5, a BET specific surface area of 40 m²/g, and a saturation magnetization of 41 Am²/kg.

EXAMPLE 3

A magnetic recording medium was prepared in the same manner as in Example 2, except for replacing 100 parts of the ferromagnetic metal powder used in the magnetic coating composition with 100 parts of the same hexagonal ferromagnetic barium ferrite powder as used in Example 2.

EXAMPLE 4

A magnetic recording medium was prepared in the same manner as in Example 2, except that the angle of approach of the intermediate coating composition was changed to 95°.

EXAMPLE 5

A magnetic recording medium was prepared in the same manner as in Example 2, except that the angle of approach of the intermediate coating composition was changed to 20° and that the speed of coating was changed to 30 m/min.

EXAMPLE 6

A magnetic recording medium was prepared in the same manner as in Example 1, except that the angle of approach of the intermediate coating composition was changed to 0° and that a shear force was imposed to the intermediate coating composition by means of a rotator at a shear rate of $10^{+5}$ sec$^{-1}$ and at an angle of 0° between the rotating axis of the rotator and the moving direction C of the substrate 15 seconds before application (see FIG. 2).

Comparative Example 1

A magnetic recording medium was prepared in the same manner as in Example 1, except that the angle of approach of the intermediate coating composition was changed to 0°.

Comparative Example 2

A magnetic recording medium was prepared in the same manner as in Example 1, except that the angle of approach of the intermediate coating composition was changed to 90°.

Comparative Example 3

A magnetic recording medium was prepared in the same manner as in Example 2, except that the angle of approach of the intermediate coating composition was changed to 90° and that 50 parts of the acicular α-Fe₂O₃ (a) used in the intermediate coating composition was replaced with 50 parts of acicular α-Fe₂O₃ (b) having an acicular ratio of 11, a BET specific surface area of 51 m²/g, and an average major axis length of 0.13 μm.

Evaluation of Magnetic Recording Medium

The magnetic recording media obtained in Examples 1 to 6 and Comparative Examples 1 to 3 were tested for arithmetical mean deviation of surface roughness profile of the magnetic layer, output, error rate at edges, bending stiffness, positional fluctuation of the tape in width direction, tape exchangeability, and durability in repeated running in accordance with the following test methods. The results obtained are shown in Tables 1 and 2 together with the main compositions, angle of approach, coefficients of orientation of the nonmagnetic powder, and coating layer thicknesses.

1) Surface Roughness (Ra)

Measured with a laser interference type surface roughness meter, Laser Interferometric Microscope Maxim 3D Model 5700 manufactured by Zygo, under the following conditions.

| | |
|---|---|
| Lens: | Fizeau x40 |
| Remove: | Cylinder |
| Filter: | off |
| Sampling length: | 180 nm |
| Number of samples: | 260 |

2) Output

Recording was carried out using an 8-mm tape deck (Hi 8, manufactured by Sony Corp.) at a recording wavelength of 0.33 μm. The reproduction output was measured with a spectrum analyzer.

3) Error Rate at Edges

The rate of errors occurring on the data recording area corresponding to 0 to 10% and 90 to 100% from one edge in the width direction was measured with ML4500 manufactured by Media Logic, and an average was obtained.

4) Bending Stiffness

Figure 3:
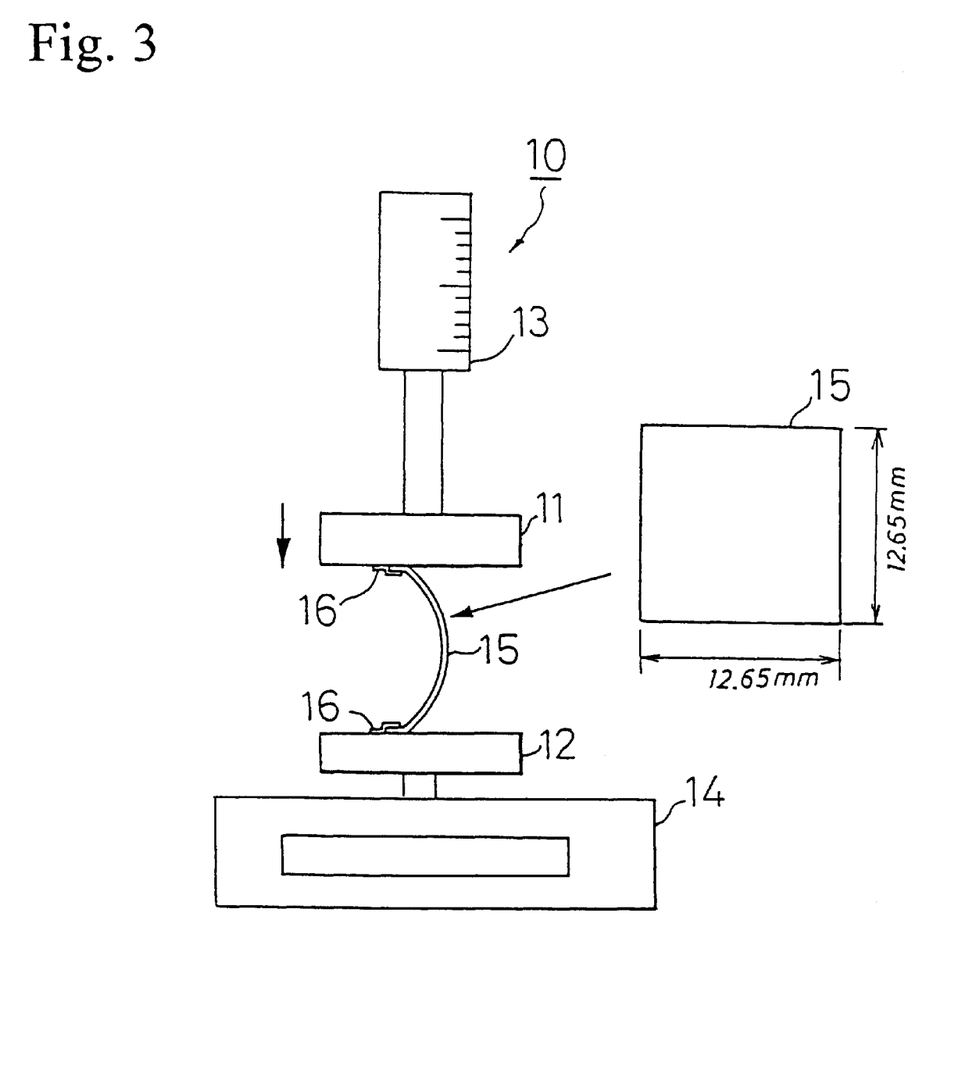
FIG. 3 is a schematic view of the apparatus used in the measurement of bending stiffness.

Measurements were made with the apparatus 10 shown in FIG. 3. The apparatus 10 is composed of upper and lower sample holding parts 11 and 12, a micrometer 13 connected to the upper sample holding part 11, and a balance 14 connected to the lower sample holding part 12. The upper sample holding part 11 is vertically movable, and its moving distance is measured with the micrometer 13.

A ½ inch (12.65 mm)-square test piece 15 was cut out of a ½ in. magnetic tape obtained in the foregoing Examples and Comparative Examples. Opposite sides of the test piece 15 in the longitudinal direction or the width direction were fixed to the upper and lower sample holding parts 11 and 12 with an adhesive tape 16 with no bending. The upper sample holding part 11 was dropped to bend the test piece 15 until the distance between the upper and lower sample holding parts 11 and 12 was reduced to 5 mm. In this situation the load displaced on the balance 14 was read and divided by 12.65 mm to obtain a bending stress in the longitudinal direction or the width direction. In this bending test the test piece was bent with its magnetic layer side inward and outward, and an average was obtained.

5) Fluctuation in Tape Width

Ten 50 m-long cassette tapes were run on a tape width meter (manufactured by Yokohama System), and the fluctuations in the width direction were measured with a laser displacement meter at 5 cm intervals. The maximum fluctuation of each cassette tape was obtained.

6) Exchangeability Test

A standard tape was recorded for 5 minutes, rewound, and the reproduction output was measured in the same manner as in the above-described measurement of output. The recording and reproduction were repeated 5 times on difference recording areas. Then the same test was carried out on the test tape. Further, the standard tape and the test tape were again tested 5 times each. If the changes in output of both the standard tape and the test tape were within 10% of the respective initial outputs, the test tape was judged "pass".

7) Repeated Running Test

A test tape was repeatedly run on an 8 mm drive over a 30-m long recording area for 24 hours. After the running test, the edges of the tape were observed under an optical microscope to check cracks.

TABLE 1

| | Example No. | | | | | |
|---|---|---|---|---|---|---|
| | 1 | 2 | 3 | 4 | 5 | 6* |
| Magnetic Layer (part by wt.): | | | | | | |
| Ferromagnetic metal powder | 100 | 100 | 0 | 100 | 100 | 100 |
| Barium ferrite | 0 | 0 | 100 | 0 | 0 | 0 |
| Intermediate Layer (part by wt.): | | | | | | |
| $\alpha\text{-}Fe_2O_3$ (a) | 100 | 50 | 50 | 50 | 50 | 100 |
| $\alpha\text{-}Fe_2O_3$ (b) | 0 | 0 | 0 | 0 | 0 | 0 |
| Barium ferrite | 0 | 50 | 50 | 50 | 50 | 0 |
| Approach Angle of Coating Composition (°) | 120 | 120 | 120 | 95 | 20 | 0 |
| Ra of Magnetic Layer (nm) | 3.8 | 3.3 | 3.4 | 3 | 3.3 | 4.3 |
| Orientation Coefficient of Nonmagnetic Powder: | | | | | | |
| $\alpha$ (longitudinal direction) | 0.8 | 0.2 | 0.25 | 0.55 | 0.5 | 0 |
| $\beta$ (width direction) | 0 | 0 | 0 | 0 | 0 | 0.25 |
| Thickness of Magnetic Layer ($\mu$m) | 0.25 | 0.25 | 0.25 | 0.25 | 0.25 | 0.25 |
| Thickness of Intermediate Layer ($\mu$m) | 1 | 1 | 1 | 1 | 1 | 1 |
| Bending Stiffness (mgf/mm): | | | | | | |
| Longitudinal direction | 2.5 | 2.5 | 2.2 | 2.5 | 2.4 | 2.1 |
| Width direction | 2.0 | 2.7 | 2.3 | 2.1 | 2.4 | 2.4 |
| High Region Output $\lambda = 0.33$ $\mu$m (%) | 101 | 116 | 128 | 109 | 112 | 100 |
| Error Rate in Edges | $6 \times 10^{-4}$ | $2 \times 10^{-5}$ | $3 \times 10^{-4}$ | $2 \times 10^{-4}$ | $8 \times 10^{-5}$ | $1 \times 10^{-4}$ |
| Max. Fluctuations in Tape Width ($\mu$m) | 2–9 | 1–8 | 1–6 | 2–7 | 5–8 | 1–6 |
| Exchangeability Test | pass | pass | pass | pass | pass | Pass |
| Cracks in Repeated Running | none | none | none | none | none | None |

Note: *Shear force: $10^{+5}$ sec$^{-1}$; angle between rotator axis and direction C: 0°; 15 seconds before application.

TABLE 2

| | Comparative Example No. | | |
|---|---|---|---|
| | 1 | 2 | 3 |
| Magnetic Layer (part by wt). | | | |
| Ferromagnetic metal Powder | 100 | 100 | 100 |
| Barium ferrite | 0 | 0 | 0 |
| Intermediate Layer (part by wt.): | | | |
| $\alpha\text{-}Fe_2O_3$ (a) | 100 | 100 | 0 |
| $\alpha\text{-}Fe_2O_3$ (b) | 0 | 0 | 50 |
| Barium ferrite | 0 | 0 | 50 |
| Approach Angle of Coating Composition (°) | 0 | 90 | 90 |
| Ra of Magnetic Layer (nm) | 2.8 | 3.2 | 3.5 |
| Orientation Coefficient of Nonmagnetic Powder: | | | |
| $\alpha$ (longitudinal direction) | 0.9 | 0.85 | 0.85 |
| $\beta$ (width direction) | 0 | 0 | 0 |
| Thickness of Magnetic Layer ($\mu$m) | 0.25 | 0.25 | 0.25 |
| Thickness of Intermediate Layer ($\mu$m) | 1 | 1 | 1 |
| Bending Stiffness (mgf/mm): | | | |
| Longitudinal direction | 2.8 | 2.7 | 2.6 |
| Width direction | 1.4 | 1.5 | 1.7 |
| High Region Output $\lambda = 0.33$ $\mu$m (%) | 110 | 97 | 104 |
| Error Rate in Edges | $3 \times 10^{-2}$ | $8 \times 10^{-2}$ | $1 \times 10^{-3}$ |
| Max. Fluctuations in Tape Width ($\mu$m) | 3–23 | 4–15 | 3–18 |
| Exchangeability Test | fail | medium | medium |

TABLE 2-continued

| | Comparative Example No. | | |
|---|---|---|---|
| | 1 | 2 | 3 |
| Cracks in Repeated Running | slightly observed | None | none |

As shown in Table 1, Examples 1 to 6 have high bending stiffness in the width direction, exhibiting excellent performance in every item of testing, i.e., output, error rate in edges, fluctuation in tape width, exchangeability, and durability in repeated running.

To the contrary, Comparative Examples 1 to 3 shown in Table 2 have low bending stiffness in the width direction and are inferior to Examples 1 to 6 in every item of testing.

Amongst the samples according to the present invention, Example 5 adopts a lower coating speed than other Examples to make the orientation ratio of the nonmagnetic powder in the intermediate layer 0.8 or less. It is seen that the productivity can be improved while maintaining a satisfactory degree of orientation by raising the coating speed and controlling the angle of approach of the coating composition within a range of from 95 to 170°. In this case, the quality of the product is also improved.

What is claimed is:

1. A magnetic recording medium comprising a substrate having thereon at least one intermediate layer comprising nonmagnetic powder and a binder and further having thereon a magnetic layer as an upper layer which comprises ferromagnetic powder and a binder, wherein said medium has a total thickness of 7 $\mu$m or less, the nonmagnetic powder in said intermediate layer is mainly acicular, with an acicular ratio of 2 to 10, and the acicular nonmagnetic powder at the interface between the substrate and the intermediate layer has a coefficient of orientation ($\alpha$) of 0 to 0.8 in the longitudinal direction, the intermediate layer is at least two times thicker than the magnetic layer, and said magnetic recording medium is a tape.

2. The magnetic recording medium according to claim 1, wherein said acicular nonmagnetic powder has a coefficient of orientation ($\alpha$) of 0 to 0.5.

3. The magnetic recording medium according to claim 1, wherein said acicular nonmagnetic powder in said intermediate layer comprises at least one material selected from the group consisting of nonmagnetic iron oxide, titanium oxide, alumina, silicon oxide, boron nitride, and mixtures thereof, and said acicular nonmagnetic powder in the interface between the substrate and the intermediate layer has a coefficient of orientation ($\alpha$) of 0 to 0.3 in the longitudinal direction.

4. The magnetic recording medium according to claim 1, wherein said acicular nonmagnetic powder at the interface between the substrate and the intermediate layer has a coefficient of orientation ($\beta$) of 0 to 0.4 in the width direction.

5. The magnetic recording medium according to claim 4, wherein said acicular nonmagnetic powder has a coefficient of orientation ($\beta$) of 0 to 0.25.

6. The magnetic recording medium according to claim 1, wherein said intermediate layer contains hexagonal tabular ferromagnetic ferrite powder.

7. The magnetic recording medium according to claim 1, wherein said nonmagnetic powder has a coefficient of orientation ($\alpha$) of 2 to 6.

8. The magnetic recording medium according to claim 1, wherein the polymer used for said substrate is polyethylene terephthalate, polyethylene terenaphthalate, or polyamide.

9. The magnetic recording medium according to claim 1, wherein the intermediate layer has a thickness of 0.25 to 2.5 $\mu$m.

10. A process for producing a magnetic recording medium according to claim 1, comprising applying an intermediate coating composition and a magnetic coating composition to a substrate, in which said intermediate coating composition receives a shear force in a given direction within 20 seconds before application, the shear direction A of the shear force is not in the plane formed of a vector B normal to the surface of the substrate to be coated and the moving direction C of the substrate, and the angle formed between the shear direction A and the vector B is from 95 to 170°.

11. A process for producing a magnetic recording medium according to claim 1, comprising applying an intermediate coating composition and a magnetic coating composition to a substrate, in which said intermediate coating composition receives a shear force by a rotator within 20 seconds before application, and the angle formed between the axial direction of said rotator and the moving direction C of the substrate is within 30°.

* * * * *